United States Patent
Osanai et al.

(10) Patent No.: US 7,725,686 B2
(45) Date of Patent: May 25, 2010

(54) SYSTEMS AND METHODS FOR PROCESSING BUFFER DATA RETIREMENT CONDITIONS

(75) Inventors: Takeki Osanai, Kanagawa (JP); Brian D. Barrick, Pflugerville, TX (US)

(73) Assignees: Habushiki Kaisha Toshiba, Tokyo (JP); International Business Machines Corporation, Armonk, NY (US)

( * ) Notice: Subject to any disclaimer, the term of this patent is extended or adjusted under 35 U.S.C. 154(b) by 539 days.

(21) Appl. No.: 11/459,501

(22) Filed: Jul. 24, 2006

(65) Prior Publication Data

US 2008/0022075 A1 Jan. 24, 2008

(51) Int. Cl.
*G06F 9/30* (2006.01)
*G06F 9/40* (2006.01)
*G06F 15/00* (2006.01)

(52) U.S. Cl. ..................................... 712/218
(58) Field of Classification Search .................. 712/218
See application file for complete search history.

(56) References Cited

OTHER PUBLICATIONS

Shen et al.; Modern Processor Design: Fundamentals of Superscalar Processors; 2003; Beta Edition; pp. 178-179,184-185,200.*
Kucuk et al.; Distributed Reorder Buffer Schemes for Low Power; 2003; ICCD'03.*

* cited by examiner

*Primary Examiner*—Aimee J Li
*Assistant Examiner*—Corey Faherty
(74) *Attorney, Agent, or Firm*—Law Offices of Mark L. Berrier

(57) ABSTRACT

Systems and methods for determining whether to retire a data entry from a buffer using multiple retirement logic units. In one embodiment, each retirement unit concurrently evaluates retirement conditions for one of the buffer entries in an associated subset (e.g., even or odd) of the buffer. Selection logic coupled to the retirement units alternately selects the first or second retirement unit for retirement of one of the entries in the associated subset. Because the aggregate number of entries retired by the combined retirement logic units is divided by the number of retirement logic units, each retirement logic unit has more time to process the retirement conditions for corresponding queue entries. The buffer may be any of a variety of different types of buffers and may comprise a single buffer, or multiple buffers.

12 Claims, 5 Drawing Sheets

SYSTEMS AND METHODS FOR PROCESSING BUFFER DATA RETIREMENT CONDITIONS

BACKGROUND OF THE INVENTION

1. Field of the Invention

The present invention relates generally processor design, and more particularly to systems and methods for using multiple units to manage retirement of queue entries, enabling faster and more efficient retirement of the entries.

2. Related Art

Memory buffers, also referred to as queues, are often used in digital circuits. Memory buffers are temporary holding areas for data that is in transit from one device to another (or from one process to another). Communicating devices often process data at different rates, and as a result, communication between these devices may be difficult and even impossible without intermediate buffers. If one device is ready to transmit data and the receiving device is not yet ready to receive the data, the data can be stored temporarily in the buffer between the devices until the receiving device is ready to accept the data.

Memory buffers can facilitate communication between devices such as processors, RAM, hard disks, etc. Most keyboards have memory buffers for the temporary storage of keystrokes. Most printers have buffers for queuing documents to be printed. Memory buffers can also be created for software programs by allocating a portion of the RAM of a computer system to act as a buffer to facilitate communication between a software program and the operating system. Within an operating system itself, buffers can facilitate the communication between processes and improve processor usage. For example, a destination process may be slower than a source process. Using a buffer between them to temporarily store the exchanged data can allow the source process to finish as soon as possible (also avoiding active waiting). Memory buffers can also exist between a software program and a hardware device. A CD-writing program, for example, creates a memory buffer in RAM during the writing process to temporarily store data before writing the data to the CD.

Typically, an entry is stored (registered) in the buffer and then removed (retired) if certain conditions are met. In very simple buffers, such as simple first-in-first-out queues (FIFOs), data entries can be retired from the buffer after the data has been transmitted successfully to the receiving device. In more complex devices, however, the number of conditions that must be met before a data entry can be retired from a buffer can significantly increase. For example, in complex multiprocessor systems, entries in a load or store queue can have many (e.g., ten or more) conditions that must be met before a data entry can be retired from the queue.

Traditionally, entries in a load or store queue of a processor have been retired according to read pointers which are incremented every cycle. In other words, a read pointer is incremented to one entry, which is retired in a first cycle, then the pointer is incremented to the next entry, which is retired in the next cycle. This was sufficient with longer cycle times and few entries (e.g., 8 entries or less). It is not sufficient, however, for some current processors which operate at higher clock frequencies (with shorter clock periods.) Further, these processors may have more (and more complex) retirement conditions than earlier processors. To process these retirement conditions, complex logic which is many levels deep is required. In addition, if it is determined by the logic that a data entry is to be retired, additional logic must generate multiple outputs whose purpose is to facilitate the retirement of the data. For example, the transferring of the data entry may require write requests to be made, pointers to be updated, counters to be incremented, etc. These additional requirements further increase the complexity of the logic and the time required to retire each entry.

Because the complexity of retirement logic is increasing while clock periods are decreasing, it is becoming very difficult to retire entries from processor load/store queues at the rate of one per clock cycle. As a result, the retirement logic can become a bottleneck, particularly in high-clock-frequency, high-performance systems. It would therefore be desirable to provide means to improve the speed and efficiency with which queue entries are retired, and to enable the retirement of one entry per clock cycle, even in high-performance systems.

SUMMARY OF THE INVENTION

One or more of the problems outlined above may be solved by the various embodiments of the invention. Broadly speaking, the invention includes systems and methods for determining whether to retire a data entry from a buffer. Multiple retirement logic units are employed. Because the aggregate number of entries retired by the combined retirement logic units is divided by the number of retirement logic units, each retirement logic unit has more time to process the retirement conditions for corresponding queue entries. Thus, for example, if there are two retirement logic units, each has twice as much time to process entries than if there were a single retirement logic unit. If it is necessary to retire one entry per cycle, each retirement logic unit has two cycles to process an entry before it is retired.

One embodiment comprises a system that includes a buffer and retirement logic. The retirement logic is coupled to the buffer and is configured to concurrently evaluate retirement conditions for two or more of the entries in the buffer. In one embodiment, the retirement logic includes two separate retirement units, each of which is associated with a unique subset of the buffer entries (e.g., even entries and odd entries.) Each retirement unit evaluates retirement conditions for entries in the associated subset, and selection logic coupled to the retirement units alternately selects the first or second retirement unit for retirement of one of the entries in the associated subset. Separate read pointers are maintained for the first and second subsets, and the read pointer for the each subset is advanced upon retirement of an entry in the corresponding subset. The buffer may be any of a variety of different types of buffers and may comprise a single buffer, or multiple buffers.

Another embodiment comprises a method in which conditions associated with multiple entries in a buffer are concurrently evaluated. In one embodiment, the evaluations are performed on a first subset of entries by a first retirement unit and on a second subset of entries by a second retirement unit. The entries can therefore be retired at a rate which is twice the rate at which an individual retirement unit evaluates entries from the corresponding subset. In one embodiment, one retirement unit evaluates even entries in the buffer, while another retirement unit evaluates odd entries in the buffer, and entries are retired alternately from the subset of even entries and the subset of odd entries. The method may be implemented in many different types of buffers (e.g., store queues, load queues, memory access queues, etc.) and the buffers may be single or multiple physical units.

Numerous additional embodiments are also possible.

The various embodiments of the present invention may provide a number of advantages over the prior art. Primarily, the average time required to determine whether a data entry is to be retired can be significantly reduced, thereby enabling retirement of buffer entries without stalling execution of high-speed processors. Similar advantages may be provided in other embodiments which are implemented in other types of devices.

BRIEF DESCRIPTION OF THE DRAWINGS

Other objects and advantages of the invention may become apparent upon reading the following detailed description and upon reference to the accompanying drawings.

Figure 1:
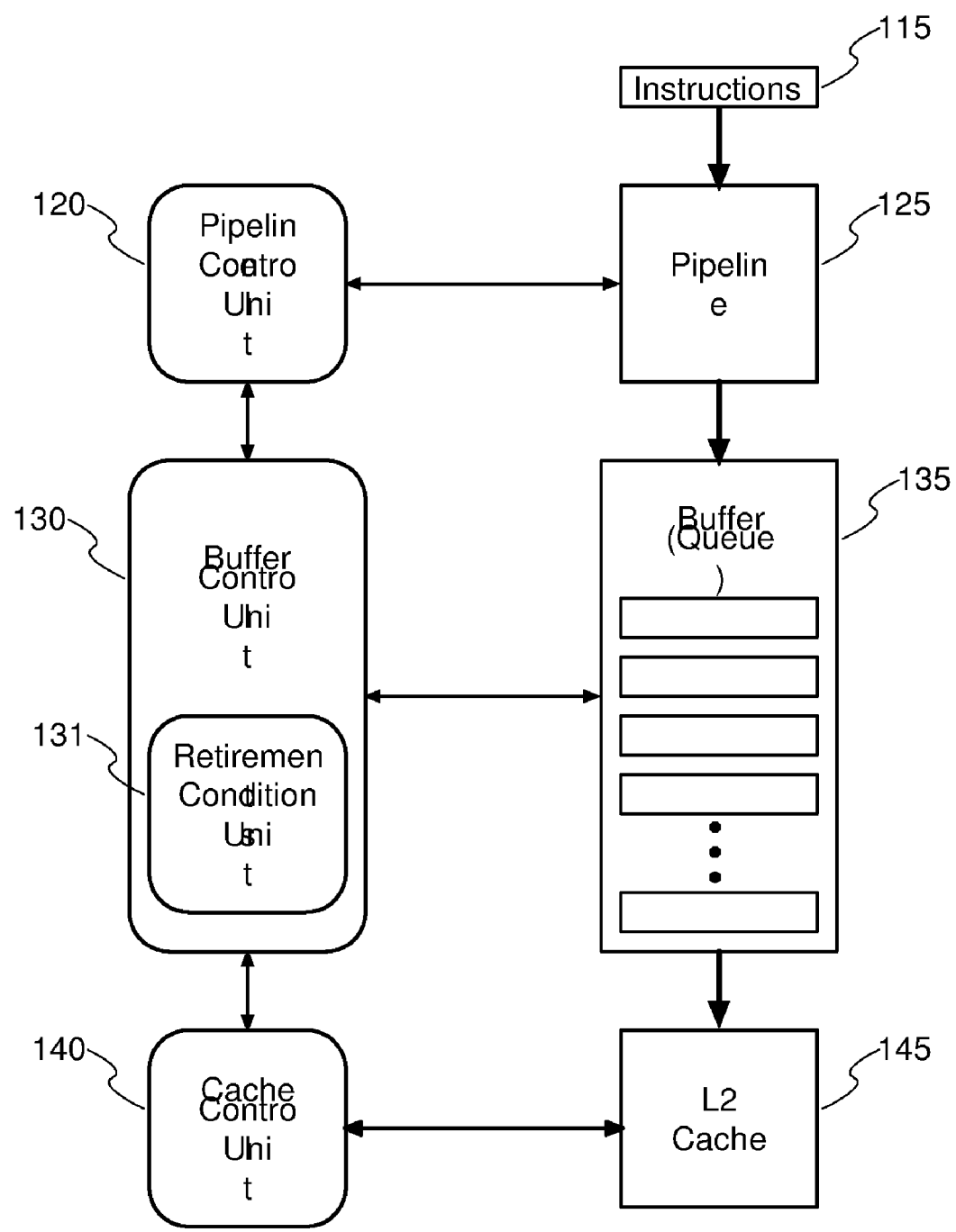
FIG. 1 is a block diagram illustrating a system configured to store data entries into a buffer and to retire the data entries from the buffer in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

Broadly speaking, the invention includes systems and methods for determining whether to retire a data entry from a buffer, where the retirement conditions are evaluated and data entries retired by multiple retirement units. As a result, the retirement determination can be completed within the desired time for high-speed systems (which may be, for example, one clock cycle).

In one embodiment of the invention, a buffer is divided into two subarrays (sets of entries) managed by separate, operationally interleaved retirement units. By sharing the workload associated with the processing of the retirement conditions, the average processing time can be reduced. Consequently, this system can accommodate the complexity of the logic required to process the retirement conditions (and the time required to propagate data through the corresponding number of levels of logic gates).

The various embodiments of the present invention may provide a number of advantages over the prior art. Primarily, the average time required to determine whether a data entry is to be retired can be significantly reduced, thereby enabling retirement of buffer entries without stalling execution of high-speed processors. Similar advantages may be provided in other embodiments which are implemented in other types of devices.

Referring to FIG. 1, a block diagram illustrating a portion of a data processor configured to buffer load/store-type operations to a cache memory is shown. The system includes a pipeline 125, a buffer 135, and a cache 145. Additionally, the system includes a pipeline control unit 120, a buffer control unit 130 and a cache control unit 140 to manage these components and control communications between them.

Instructions 115 are executed in pipeline 125, which produces load/store requests for data in cache 145. The operation of pipeline 125 is controlled by the pipeline control unit 120. The operation of cache 145 is controlled by cache control unit 140. Because the memory system cannot service each of these load/store requests immediately as they exit pipeline 125, they must be stored until the corresponding operations are completed. Buffer 135 is therefore provided as an interface between pipeline 125 and cache 145 so that the load/store requests can be temporarily stored while they are serviced. The operation of buffer 135 is controlled by buffer control unit 130. Once each request is serviced, it needs to be removed, or retired, from the buffer in order to make room for subsequent load/store requests. This function is controlled by retirement conditions unit 131.

Each data entry stored in buffer 135 advances through the buffer until the data is being considered for retirement from buffer 135. Buffer data retirement conditions unit 131 is configured to determine, according to a set of retirement conditions, whether a data entry being considered for retirement can be retired. Buffer data retirement conditions unit 131 may be part of buffer control unit 130 or buffer data retirement conditions unit 131 may be a separate unit.

If buffer data retirement conditions unit 131 determines that a data entry in buffer 135 can be retired, buffer data retirement conditions unit 131 is configured to generate and output the appropriate signals required to facilitate the retirement of the data entry.

Figure 2:
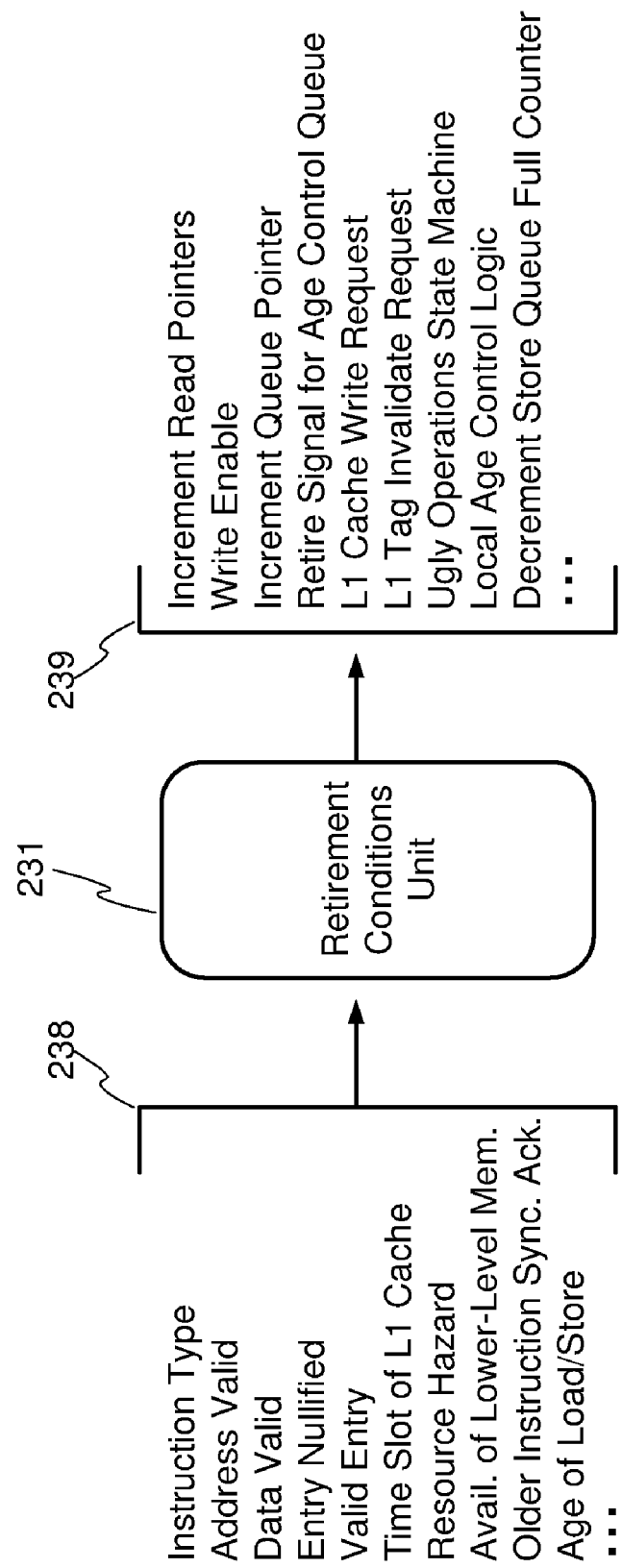
FIG. 2 is a block diagram illustrating a buffer data retirement conditions unit configured to determine whether data entries can be retired from a buffer in accordance with one embodiment.

Referring to FIG. 2, a block diagram illustrating a buffer data retirement conditions unit configured to determine whether data entries can be retired from a buffer in accordance with one embodiment is shown. Buffer data retirement conditions unit 231 is configured to receive multiple signals associated with data retirement information 238 and to process those signals in order to determine whether a data entry being considered for retirement can be retired from the buffer.

The retirement information 238 may, for example, include: instruction type, data valid, entry nullified, address valid, page attribute, L1 cache hit, L1 cache time slot availability, L2 cache interface queue availability, entry age, sync operations acknowledgement, etc. In other embodiments, depending on the type of the buffer entry, a different set of logic conditions may be used to evaluate whether a data entry should be retired. The retirement information is supplied to the buffer data retirement conditions unit 231 to be processed when the data entry is being considered for retirement.

Buffer data retirement conditions unit 231 is further configured to generate required output signals associated with data retirement (239) from the buffer. A retirement decision represents a determination as to whether the data entry in the buffer should be retired. Due to the large number of inputs, a complicated circuit of logic gates is required to facilitate the retirement of the data entry. When the buffer data retirement conditions unit 231 determines the retirement conditions for a data entry have been met, the unit may be configured, for example, to take various actions, such as to: generate signals to increment read pointers of address/data/control portion of the queue; enable writes to address/data/control portion of the queue; generate signals to increment read pointers of attribute bits in the queue; send a bus request at the store port to a lower level in the memory hierarchy; send a queue retire signal for age control; generate a signal to decrement a store queue full counter; send a L1 cache write request; send a L1 tag invalidate request; generate a signal to increment an icbi counter; generate a signal to increment a CIU store queue counter; generate a signal to activate an ugly ops state machine; or generate a signal to control local age control logic.

Because the entries in the buffer cannot be overwritten until the corresponding load/store operations have been completed, it is necessary to determine when these operations are completed. This is defined by a set of conditions referred to as retirement conditions. When these conditions are satisfied, the operation is complete, and the entry can be removed from the buffer or overwritten. This is referred to as retiring the entry from the buffer.

Conventionally, the conditions (information) which form the basis for determining when an entry can be retired are evaluated by a single retirement conditions unit. As noted above, it is typically desirable for this unit to retire an entry on every clock cycle, but this is becoming increasingly difficult. The present system therefore uses two retirement conditions units to evaluate the conditions for retiring entries from the buffer (although more could be used in alternative embodiments.) One is responsible for the even entries and the other is responsible for the odd entries.

The buffer control unit manages the flow of data (entries) through the buffer. The buffer control unit can coordinate such things as the buffer read and write pointers, and communications with the sender and receiver of the information associated with buffer entries. Using the retirement conditions unit(s), the buffer control unit processes information associated with the buffer entries to retire the respective entries. In a conventional system employing one retirement unit, if evaluation of the retirement conditions for an entry require more than one cycle to evaluate, the buffer will effectively be stalled for one cycle, waiting for the retirement conditions evaluation to complete. If, on the other hand, two retirement units are used to evaluate the retirement conditions for alternate entries (e.g., one processes even entries and the other processes odd entries,) each of the units can evaluate corresponding entries' retirement conditions for two cycles and still meet an aggregate requirement to retire one entry per cycle.

Figure 3:
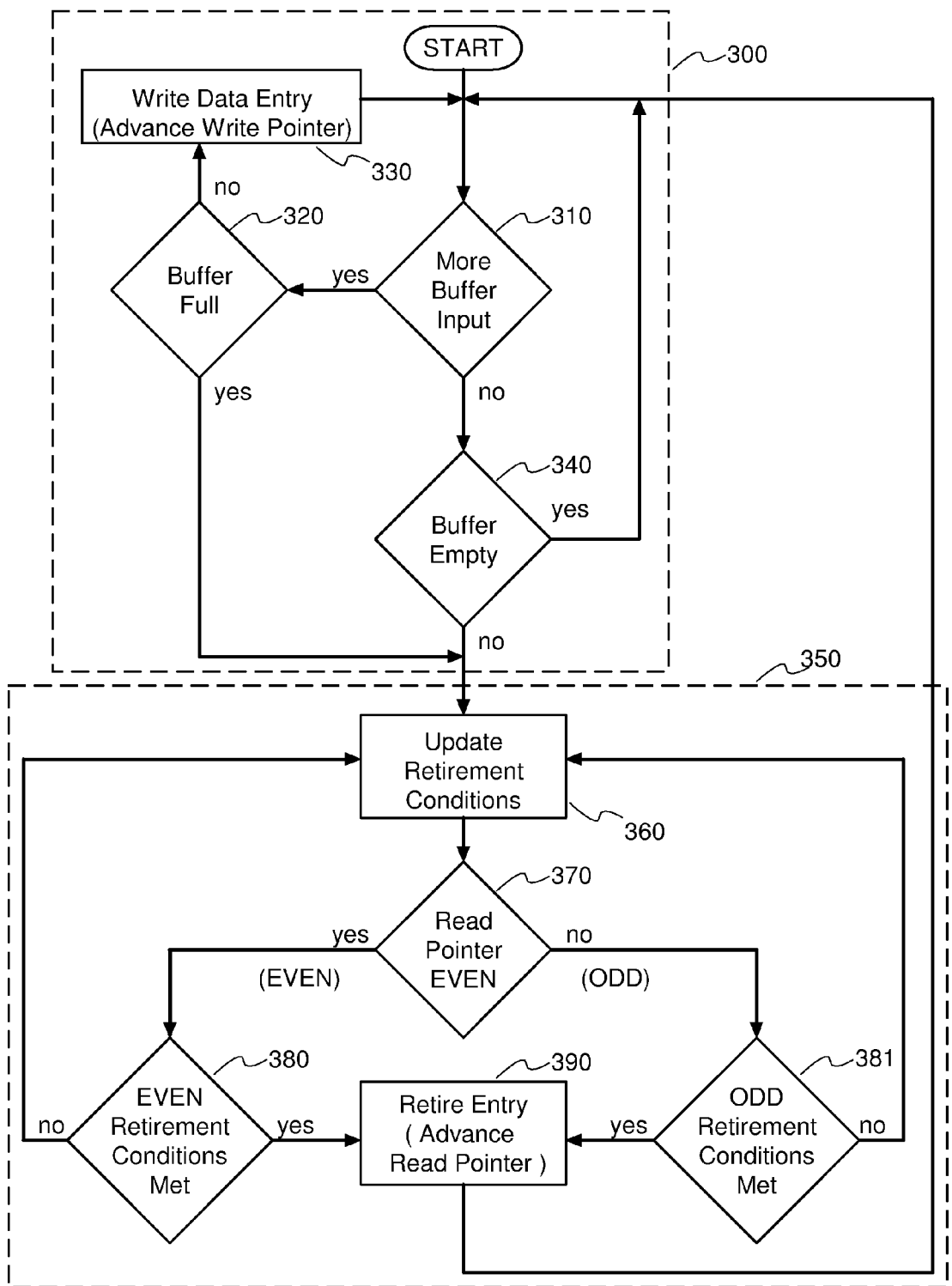
FIG. 3 is a flowchart illustrating a method for retiring a buffer in accordance with one embodiment.
Figure 4:
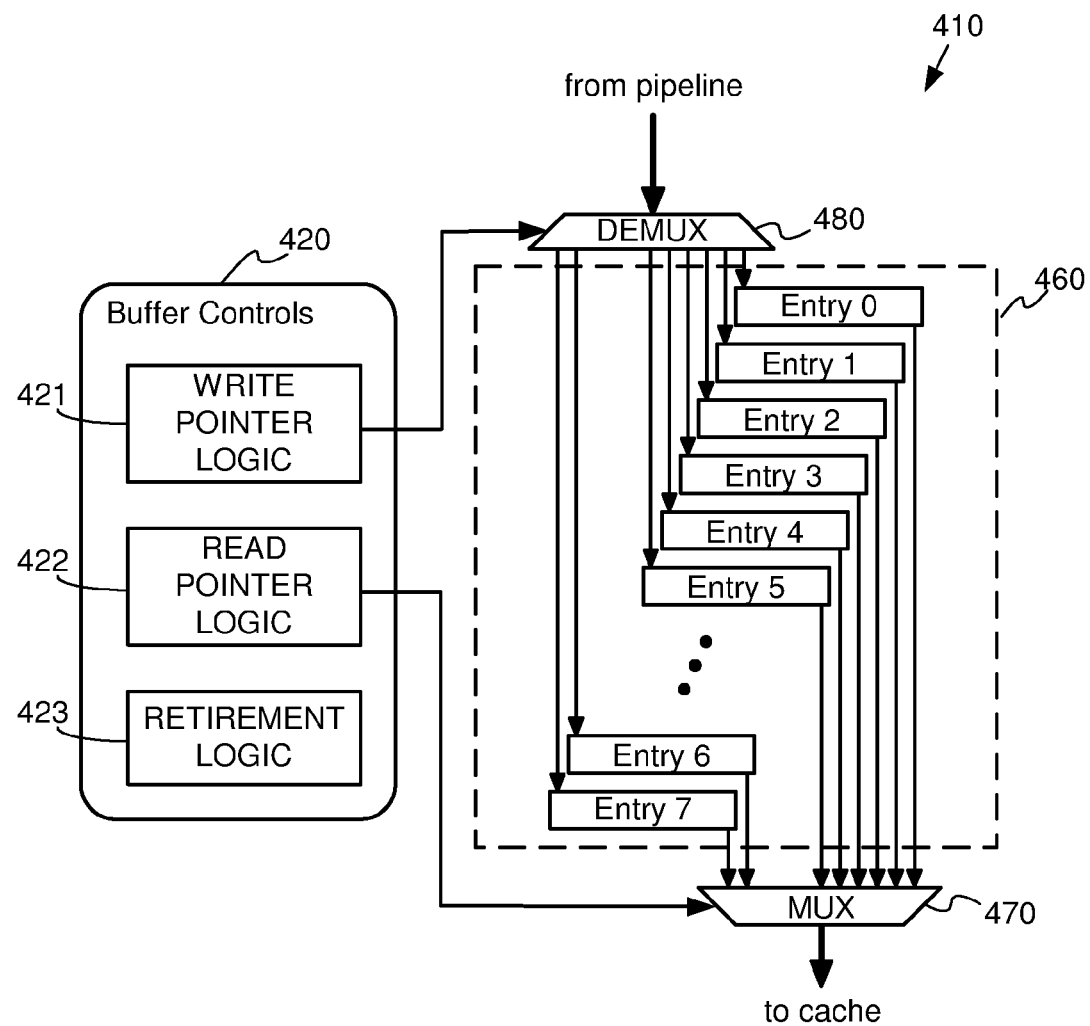
FIG. 4 illustrates a functional block diagram of a system in accordance with one embodiment.

In the embodiments of FIGS. 3 and 4, there are two retirement units. Each of the retirement units is responsible for and coupled to every other buffer entry. One retirement unit is coupled to the even entries and the other to the odd entries. In the embodiment of FIG. 3 an entry is retired by advancing the read pointer past the entry. That entry can then be overwritten (and the next entry considered for retirement).

Referring to FIG. 3, a flowchart illustrating a method for retiring a buffer entry in accordance with one embodiment is shown. In this embodiment, a portion of the method (identified by reference number 300) is associated with a buffer control unit's input unit. Another portion of the method (identified by reference number 350) is associated with two retirement units. A write pointer is used to indicate to which entry data is written/input and a read pointer is used to indicate from which entry data is read/output. The buffer is circularly accessed. In other words, the pointers indicate successive entries in order (e.g., 0, 1, 2, . . . ,) and return to the first entry following the last entry An entry can be overwritten/retired, after successfully being read/output. The buffer is full when the buffer's write pointer cannot be advanced because the next entry has not been retired.

As shown in FIG. 3, data (e.g., a load or store request) is received from a processor pipeline and stored in a load or store queue (a buffer). When input data is provided to the buffer (310) and space is available in the buffer (320), the data is written into the buffer at the current position of the write pointer and the write pointer is advanced (330). Once there are entries in the buffer (340), the entries need to be evaluated for retirement (350).

As noted above, retirement control in this embodiment is performed by two retirement units—one "EVEN" and one "ODD". When the read pointer is even, the control passes to 380 and the retirement conditions associated with the current entry (indicated by the read pointer) are examined and the read pointer advanced (390) to the next available (odd) entry when the retirement conditions are met. If the buffer contains another entry, control will pass to 381 on the next pass through retirement control 350. The effect is that control passes alternately through 380 (EVEN) and 381 (ODD,) allowing two cycles for each retirement unit to process the retirement conditions for the each of the respective entries.

Illustrated in FIG. 4 is a functional block diagram of a buffer system in accordance with one embodiment. (It should be noted that the components and connections between components are greatly simplified for the purposes of this discussion.) The buffer comprises buffer controls 420, a series of buffer entries 460 (Entry 0 through Entry 7), input demultiplexer 480 and output multiplexer 470. The buffer controls (420) include write pointer logic 421, read pointer logic 422 and retirement logic 423.

When data for an entry is received from the processor pipeline, write pointer logic 421 controls demultiplexer 480 to select the particular one of buffer entries 460 in which the data will be stored. After information is stored in one of the buffer entries, the write pointer is advanced to indicate the next entry in the buffer. Read pointer logic 422 determines which of buffer entries 460 will be retired. Entries are selected by using read pointer logic 422 to control multiplexer 470. Read pointer logic 422 operates in conjunction with retirement logic 423, which maintains read pointers for each of the retirement units, since the retirement units concurrently evaluate retirement conditions for different ones of the buffer entries.

Figure 5:
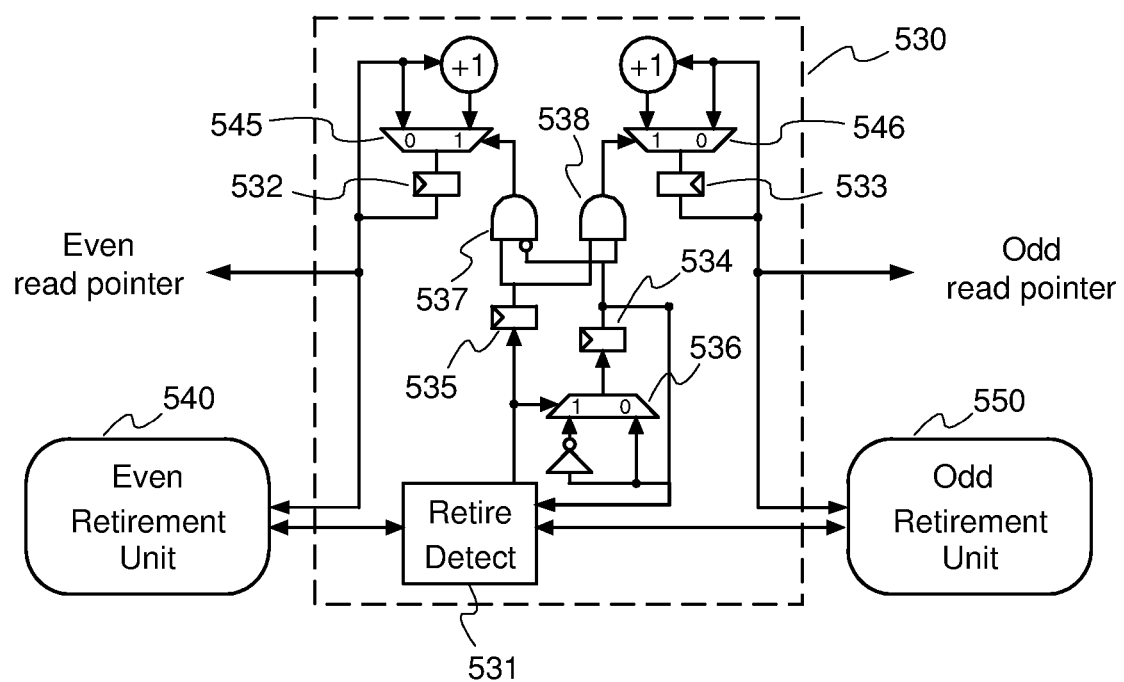
FIG. 5 illustrates a functional block diagram of a buffer system and read pointer logic in accordance with one embodiment.

FIG. 5 is a functional block diagram illustrating in more detail the read pointer logic and retirement logic of the buffer system in accordance with one embodiment. The diagram shows exemplary logic (520) for read pointer management. In this figure, the buffer entries are shown broken into two sets 562 and 563. The data received from the processor pipeline is read into these entries, alternately into one set, and then the other. Buffer entry set 562 is referred to as the "EVEN" set, and the retirement of its entries is determined by even retirement unit 540. Buffer entry set 563 is referred to as the "ODD" set and the retirement of its entries is determined by odd retirement unit 550.

Multiplexers 572, 573, and 574 are controlled to select one of the buffer entries to be output from the buffer. This is done using three pointers, one for each multiplexer. The pointer values are stored in latches 532, 533, and 534, respectively. The entry to be read from even set 562 is selected by multiplexer 572 according to the value in latch 532. The entry to be read from odd set 563 is selected by multiplexer 573 according to the value in latch 533. This provides two entries from which to choose. The value in latch 534 (the "even/odd bit")

is used to control multiplexer 574 to select one of these two entries. Latch 535 is used to properly time the retirement signal.

The value in latch 534 is used to select either the even set or the odd set. An inverter and multiplexer are used here to alternately store 0 or 1 (in other words, to flip the even/odd bit), thereby determining whether the selected entry will be from the even set or the odd set. The current pointer state (the even/odd bit) and its inverse are provided as inputs to a multiplexer 536 which is controlled by a signal from retire detect logic 531. Retire detect logic 531 receives signals from retirement units 540 and 550 indicating whether the retirement conditions being evaluated by each indicate that the respective buffer entries can be retired. Retire detect logic 531 selects the appropriate one of the signals (based upon the current state of the even/odd bit) and asserts a signal (which controls multiplexer 536) if the corresponding buffer entry can be retired. If this signal is asserted, multiplexer 536 selects the inverse of the current even/odd bit, thereby flipping the value in latch 534. If the retirement signal from retire detect logic 531 is not asserted, multiplexer 536 selects the current even/odd bit value, so that this value is maintained in latch 534 for another cycle.

In addition to controlling multiplexer 536, the retirement signal output by retire detect logic 531 is stored in latch 535, has output is then provided to AND gates 537 and 538. If the signal output by retire detect logic 531 is not asserted, one of the inputs to each of AND gates 537 and 538 is 0, so the outputs of these AND gates (which are used to control multiplexers 545 and 546, respectively) are not asserted. As a result, multiplexers 545 and 546 select the inputs which corresponds to the values in latches 532 and 533, respectively, and the values in these latches are maintained. If, on the other hand, the signal output by retire detect logic 531 is asserted, the value in latch 535 will be 1, so the corresponding inputs to AND gates 537 and 538 will be 1's. Because the second input to AND gate 538 is the current value of the even/odd bit in latch 534 and the second input to AND gate 537 is the inverse of the current value of the even/odd bit, the output of one of these two AND gates will be asserted, depending upon the current value of the even/odd bit. If the output of AND gate 537 is a 1, multiplexer 545 will select the input that is the value in latch 532, incremented by 1. As a result, the next buffer entry in the even set of entries will be selected for evaluation of the corresponding retirement conditions. Of course, if the even/odd bit had been in the opposite state, the output of AND gate 538 would be 1, causing multiplexer 546 to select the incremented value of the odd pointer in latch 533, and this incremented value would have caused the next entry in the odd set of buffer entries to be considered for retirement.

The system illustrated in FIG. 5 thereby enables the concurrent evaluation of retirement conditions for two different buffer entries using the even and odd retirement units. Each of the retirement units can therefore use two cycles to evaluate the retirement conditions for a single buffer entry. Because the system alternately retires a buffer corresponding to one of the retirement units and then the other, the evaluation period for each buffer entries actually overlaps with two others—the end of the preceding entry from the other set, and the beginning of the following entry from the other set. As noted above, this arrangement allows the system to evaluate the retirement conditions corresponding to each entry for two cycles, while still retiring entries from the buffer at a rate of one per cycle.

While the embodiments described above utilize to retirement units in order to double the amount of time allowed for evaluation of each buffer entry's retirement conditions alternative embodiments could employ additional retirement units to increase the allowed evaluation time. For example, if three retirement units were used, each unit could evaluate the retirement conditions of a corresponding entry for three cycles while maintaining an overall retirement rate of one entry per cycle. Further, just as a person of skill in the art of the invention could vary the number of retirement units used in a particular embodiment, other details of the foregoing embodiments could be varied as well. For instance, rather than implementing the buffer as a single buffer with even and odd sets of entries, separate buffers could be used. Similarly, different logic configurations can be used to achieve the retirement of entries from alternating sets. Many other variations could also be implemented in alternative embodiments.

In one embodiment, buffer 510 may be a store queue. For a store queue, information that may be used as retirement data for buffer data retirement conditions may include: whether the data is valid; the instruction type; whether the entry is nullified; what the page attributes are; whether the entry corresponds to a cache hit/miss; whether the address is valid; etc.

In another embodiment, buffer 510 may be a load miss queue. For a load miss queue, information that may be used as retirement data for buffer data retirement conditions may include, for instance: whether the data is valid; the instruction type; whether the entry is nullified; what the page attributes are; the reason the entry is pending; etc.

In yet another embodiment, buffer 510 may be a buffer for accessing the L2 cache or other lower level caches or it may be a non-cache buffer. For such a buffer, information that may be used as retirement data for buffer data retirement conditions may include: whether the data is valid; the type of operation; whether the entry is nullified; what the page attributes are; whether the entry corresponds to a cache hit/miss; the reason the entry is pending; etc.

In another alternative embodiment, buffer 510 may be a bus interface buffer for issuing bus operations. For a bus buffer, information that may be used as retirement data for buffer data retirement conditions may include: whether the data is valid; the bus command type; whether the entry is nullified; what the page attributes are; the reason the entry is pending; etc.

In another alternative embodiment, buffer 510 may be a buffer for issuing instructions such as a reservation station for an out-of-order processor. For a buffer for issuing instructions, information that may be used as retirement data for buffer data retirement conditions may include: whether the data is valid; the type of instruction; whether there are register dependencies (RAW, WAR, WAW); whether there are address dependencies between load/store instructions; the reason the entry is pending; etc.

It should be noted that, while the embodiments above are described in the context of processor queues (e.g., store queues, load miss queues, cache access queues, etc.,) alternative embodiments may be implemented in other types of buffers/queues in other types of systems. The need for preprocessing of queue entries as described above may simply be more pressing in the case of processors, since there is an ever-increasing demand to process data (and retire queue entries) more quickly. The invention, as recited in the following claims, should therefore be construed to include these alternative embodiments.

Those of skill in the art will understand that information and signals may be represented using any of a variety of different technologies and techniques. For example, data, instructions, commands, information, signals, bits and symbols that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as hardware (including computer systems,) software (including firmware,) or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with general purpose processors, digital signal processors (DSPs), media processors, application specific integrated circuits (ASICs), field programmable gate arrays (FPGAs) or other programmable logic devices, discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP, a media processor and a microprocessor, a plurality of microprocessors, one or more microprocessors in conjunction with a DSP core, a media processor or any other such configuration.

The steps of a method or algorithm described in connection with the embodiments disclosed herein may be embodied directly in hardware, in a software module (including firmware) executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A system comprising:
a buffer having a plurality of entries; and
retirement logic coupled to the buffer;
wherein the retirement logic is configured to concurrently evaluate all of the retirement conditions associated with each of two or more of the entries and thereby determine whether the entries can be retired,
wherein a minimum time greater than one processor clock cycle is required for signals associated with the retirement conditions associated with each entry to propagate through the retirement logic, and wherein the signals associated with the retirement conditions are not clocked during the minimum time during which the signals propagate through the retirement logic,
wherein the retirement logic comprises a first retirement unit and a second retirement unit,
wherein the first retirement unit is associated with an even-numbered unique subset of the entries and the second retirement unit is associated with an odd-numbered unique subset of the entries,
wherein the retirement logic further comprises selection logic configured to alternately select the first retirement unit or the second retirement unit for evaluation of retirement conditions for of one of the entries in the associated subset,
wherein the retirement logic is configured to retire the entries in the buffer at a rate of substantially one entry per clock cycle.

2. The system of claim 1, wherein the retirement logic further comprises read pointer logic to maintain a first read pointer for the even-numbered subset and a second read pointer for the odd-numbered subset, wherein the read pointer logic is configured to advance the first pointer upon retirement of an entry in the even-numbered subset and to advance the second pointer upon retirement of an entry in the odd-numbered subset.

3. The system of claim 1, wherein the retirement logic is configured to alternately retire entries from the even-numbered subset and the odd-numbered subset.

4. The system of claim 1, wherein the buffer comprises a single physical buffer, and wherein the entries in each subset are contained in the single physical buffer.

5. The system of claim 1, wherein the buffer comprises two or more physical buffers, and wherein the entries in each subset are contained in a corresponding one of the physical buffers.

6. The system of claim 1, wherein the buffer is selected from the group consisting of: a store queue; a load queue; a lower memory access queue; a bus interface buffer; and an instruction issue buffer.

7. A system comprising:
a buffer having a plurality of entries, wherein each of the entries has a plurality of associated retirement conditions;
retirement logic coupled to the buffer
wherein the retirement logic comprises a first retirement unit and a second retirement unit,
wherein the first retirement unit is associated with a first unique subset of the entries, wherein for each entry in the first unique subset, the retirement conditions associated with the entry are provided to the first retirement unit, wherein the entry is evaluated for retirement by the first retirement unit based upon the associated retirement conditions, wherein signals associated with the entry's retirement conditions require, at a minimum, more than one clock cycle to propagate through the first retirement unit, and wherein the signals associated with the entry's retirement conditions are not clocked during the minimum time during which the signals propagate through the retirement unit, wherein the second retirement unit is associated with a second unique subset of the entries, wherein for each entry in the second unique subset, the retirement conditions associated with the entry are provided to the second retirement unit, wherein the entry is evaluated for retirement by the second retirement unit based upon the associated retirement conditions, wherein signals associated with the entry's retirement conditions require, at a minimum, more than one clock cycle to propagate through the first retirement unit, and wherein the signals associated with the entry's retirement conditions are not clocked during the minimum time during which the signals propagate through the retirement unit, wherein the retirement logic further comprises selection logic configured to alternately select the first retirement unit or the second retirement unit for retirement of the entries indicated by the associated head pointers, wherein the first retirement unit and the second retirement unit are configured to concurrently evaluate the retirement conditions associated with one of the entries in the first unique subset and one of the entries in the second unique subset, and wherein the retirement logic is configured to retire the entries in the buffer at a rate of substantially one entry per clock cycle.

8. A method for evaluating entries of a buffer wherein a minimum time of more than one clock cycle is required for signals associated with the retirement conditions to propagate through retirement logic associated with the buffer, the method comprising:

providing a buffer having a plurality of entries;

providing a plurality of retirement units, wherein for each retirement unit, a minimum time of more than one processor clock cycle is required for signals associated with all of the retirement conditions to propagate through the retirement unit, and wherein the signals associated with the retirement conditions are not clocked by the retirement unit during the minimum time during which the signals propagate through the retirement unit;

providing signals associated with the retirement conditions of successive buffer entries to alternate ones of the retirement units, wherein propagation of signals through alternate ones of the retirement units is initiated in alternate clock cycles and wherein alternate ones of the retirement units complete propagation of corresponding retirement condition signals in alternate clock cycles; and retiring the buffer entries at a cumulative rate of substantially one entry per clock cycle, with each retirement unit retiring corresponding ones of the buffer entries at a rate of less than one entry per clock cycle.

9. The method of claim 8, wherein providing the plurality of retirement units comprises providing two retirement units, and wherein the first retirement unit is associated with an even-numbered unique subset of the buffer entries and the second retirement unit is associated with an odd-numbered unique subset of the buffer entries.

10. The method of claim 8, further comprising maintaining a first read pointer indicating an entry being considered for retirement in the even-numbered subset and a second read pointer indicating an entry being considered for retirement.

11. The method of claim 8, wherein the read pointer logic is configured to advance the first pointer upon retirement of an entry in the even-numbered subset and to advance the second pointer upon retirement of an entry in the odd-numbered subset.

12. The method of claim 8, wherein the buffer is selected from the group consisting of: a store queue; a load queue; a lower memory access queue; a bus interface buffer; and an instruction issue buffer.

\* \* \* \* \*